United States Patent [19]
Bird

[11] Patent Number: 5,863,365
[45] Date of Patent: Jan. 26, 1999

[54] METHOD OF MANUFACTURING COMPOSITE ARTICLES

[75] Inventor: Cory R. Bird, Mojave, Calif.

[73] Assignee: Scaled Composites, Inc., Mojave, Calif.

[21] Appl. No.: 846,722

[22] Filed: Apr. 30, 1997

[51] Int. Cl.[6] .................................................. B32B 31/20
[52] U.S. Cl. ........................... 156/87; 156/245; 156/285; 156/307.3; 264/553; 264/102; 264/220
[58] Field of Search ................................ 156/87, 245, 285, 156/286, 307.1, 307.3; 264/511, 552, 553, 554, 220, 221, 241, 102

[56] References Cited

U.S. PATENT DOCUMENTS

| | | |
|---|---|---|
| 2,451,131 | 10/1948 | Vidal et al. . |
| 3,344,007 | 9/1967 | Skoggard . |
| 3,985,330 | 10/1976 | Dorfman . |
| 4,492,607 | 1/1985 | Halcomb . |
| 4,608,220 | 8/1986 | Caldwell et al. . |
| 4,702,870 | 10/1987 | Setterholm et al. . |
| 5,378,134 | 1/1995 | Blot et al. . |
| 5,501,832 | 3/1996 | Adams . |

Primary Examiner—Michael W. Ball
Assistant Examiner—Michael A. Tolin
Attorney, Agent, or Firm—Gregory Garmong

[57] ABSTRACT

A composite article is prepared by positioning composite material precursor between a layup tool and a sculpted block of an open-celled foam material. The block has a first face sculpted to define a first face of the composite article. A pressure is applied between the layup tool and the block, and thence to the composite material precursor. Simultaneously with the pressure application, the assembly is heated to compact and cure the composite material. The open-celled foam block acts both as a breather material to allow gas to escape from the compacting composite material and a bleeder material to receive resin that is forced out of the composite material under pressure.

20 Claims, 4 Drawing Sheets

METHOD OF MANUFACTURING COMPOSITE ARTICLES

BACKGROUND OF THE INVENTION

This invention relates to manufacturing technology, and, more particularly, to the manufacturing of articles of composite materials.

Organic-matrix composite materials are used in structures because of their excellent mechanical properties, low weight, and ability to tailor the properties of structures made of these materials to meet specific needs. The composite materials have reinforcing fibers such as carbon fibers embedded in an organic matrix material such as a curable epoxy resin. The use of the composite materials has required the development of new manufacturing technologies, because the composite materials are furnished in a precursor form. One form of precursor is fiber bundles which are positioned to the desired shape and then enrobed in the flowable matrix precursor composition, which is later cured to a hardened state. Another form of composite material precursor is prepreg plies constituting fibers embedded in a partially cured resin material, which are collated (laid up) onto a form into the desired shape and later fully cured.

In one conventional manufacturing approach using prepreg precursor material, the individual plies of the prepreg are collated onto a tool, and a matching tool is pressed against the exposed side of the collated prepreg, while the assembly is heated. The combined heating and pressing consolidates the prepreg material and thereafter causes it to cure and harden. The matching tool may be either a rigid tool or a sheet of rubber bladder material against which a gas pressure is applied. Rigid matching tools are relatively expensive to make and use. Rubber bladder matching tools are limited as to the type of structures that may be produced.

In either case, gas released from the composite material during compacting must be removed, and excess resin material that is extruded out of the composite material as it compacts must be conducted away from the composite material. To accomplish these functions, a breather cloth is typically placed against the surface of the collated composite material. The breather cloth provides a pathway for removal of the evolved gas and, to a minor extent, the excess extruded resin. Bleeder openings may also be provided through the tooling to remove resin in amounts greater than may be accommodated by the breather cloth. The presence of a large amount of excess resin to be removed may preclude the use of a rubber bladder as a pressure tool.

The inventor has recognized a need for an improved technique for manufacturing composite articles that is relatively inexpensive and allows the processing of precursor materials having large amounts of evolved gas and extruded resin. The present invention satisfies this need, and further provides related advantages.

SUMMARY OF THE INVENTION

The present invention provides a manufacturing method for producing composite structures. Complex articles may be successfully produced even when there is a large amount of evolved gas and extruded resin resulting from the compaction of the precursor material. Additionally, finer features than possible with conventional techniques and features with negative draft geometries may be produced. Tooling and manufacturing costs are substantially reduced as compared with conventional approaches.

In accordance with the invention, a method for manufacturing a composite article comprises the steps of providing a layup tool, and providing a block of an open-celled porous material. The block has a first face sculpted to define a first face of the composite article and an oppositely disposed second face. A composite material precursor is positioned between the layup tool and the block of the open-celled porous material. The method further includes applying a pressure between the layup tool and the block of the open-celled porous material, and thence to the composite material precursor, and simultaneous heating the fabrication assembly to cause the composite material precursor to compact and cure.

The approach is preferably utilized with a concavely shaped female layup tool that is either smooth on the tooling face or has three-dimensional features thereon, which tooling face defines the shape of the second face of the finished composite article. The block of open-celled porous material is sculpted on its first face to a shape that defines the first face of the finished composite article. The sculpted face has the inverse of the features on the first face of the final composite article—recesses in the finished article are raised on the sculpted face and vice versa. The application of pressure to the block forces the sculpted first face of the block against the exposed face of the collated composite material, thereby forming the features in the first face of the composite material prior to and during its curing.

As this pressure application occurs, the composite material precursor compacts, because voids and vacancies are inevitably present in the composite layup after the collation procedure. The compacting of the composite material precursor causes gas to evolve, which evolved gas is received into the pores of the porous material. Additionally, excess flowable resin material extrudes from the composite material precursor and is received into the pores of the porous material. The porous material thereby simultaneously acts as a breather material and as a bleeder material. When the fabrication procedure is complete, the block with its absorbed extruded resin material is discarded.

The shape of the features sculpted onto the first face of the block of porous material may be more complex and finer in scale than possible with the use of rubber bladder materials, whose ability to define such features is limited. The relatively rigid material of the porous block forces compaction in the interior of fine features, which are inaccessible to bladders. Negative draft (i.e., undercut) features impossible to make with bladder pressure media are readily made with this approach.

The block of porous material is desirably made of a readily available material, expanded polystyrene beads known as Styrofoam. The first face of the block may be easily sculpted by machining (i.e., cutting) procedures. The Styrofoam material may also be cast to shape in a mold. The latter approach provides a convenient and inexpensive approach for preparing large numbers of precisely shaped, disposable porous blocks.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
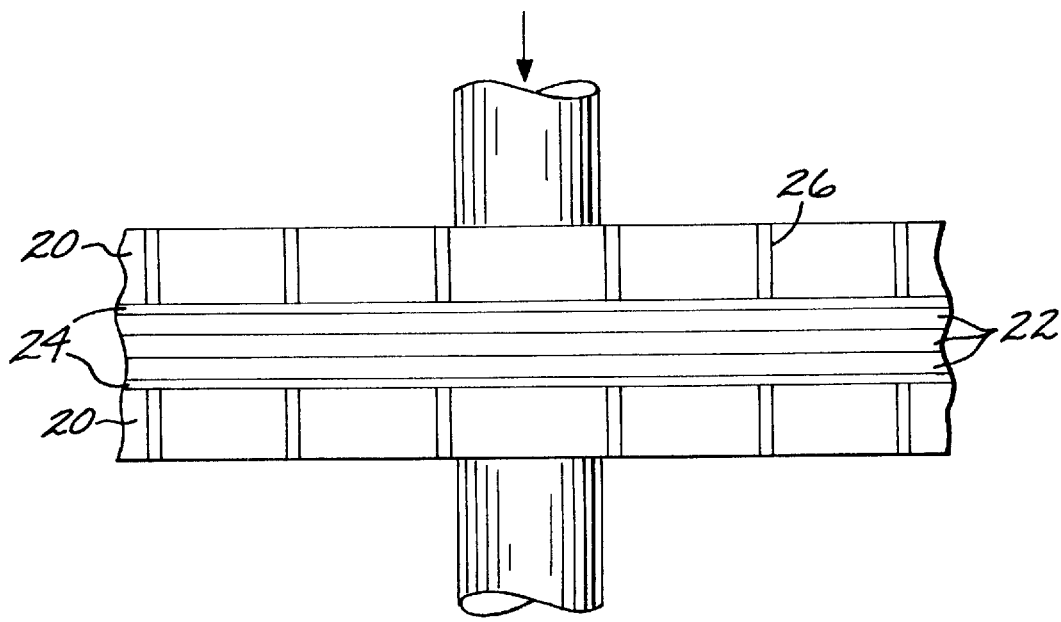
FIG. 1 is a first prior art process for manufacturing a composite article.

FIG. 1 illustrates a typical prior art manufacturing operation used to make composite articles. A press having a pair of opposing metallic platens 20 is provided. A layup of three layers (or as many as needed) of uncured composite material precursor 22 is captured between the platens 20. When the layers 22 are pressed and simultaneously heated, gas escapes from within the layers and also some of the uncured liquid resin extrudes out of the layup. To allow the air to escape and the liquid resin to escape, a layer of breather cloth 24 is placed on each side of the layup, against the platens 20. If the part is large in lateral extent, the platens may also have passages 26 to allow the excess air and resin to escape through the platens.

Figure 2:
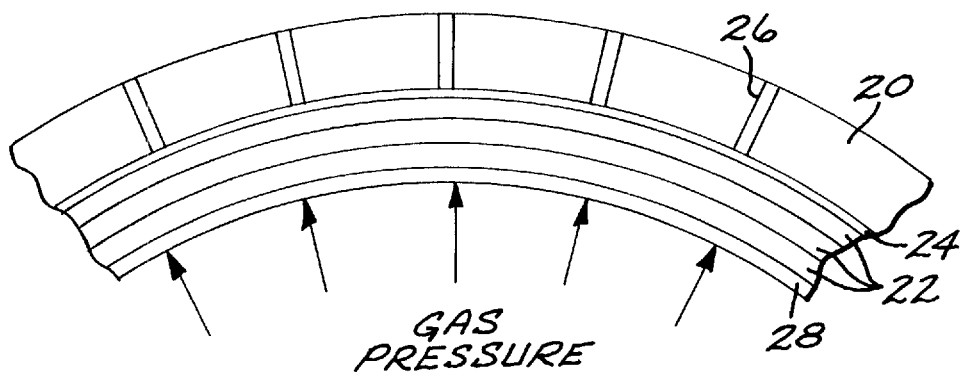
FIG. 2 is a second prior art process for manufacturing a composite article.

FIG. 2 shows a variation, where the lower platen is replaced by a rubber bladder 28. Gas pressure is applied to the back side of the bladder 28, forcing the layers of composite material 22 against the upper platen. The approach of FIG. 2 is widely used in industry today.

Figure 3:
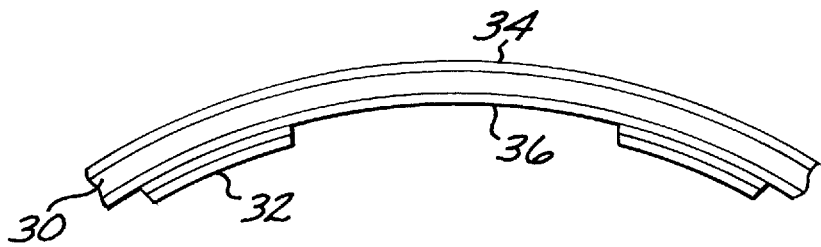
FIG. 3 is a sectional view of a portion of an aircraft fuselage made according to the invention.

The inventor is concerned with the problem of making large integral pieces of an aircraft fuselage from composite material. FIG. 3 shows a portion of the fuselage in section, having a wall 30. An outer surface 34 of the wall is generally smooth and largely featureless, as the outer fuselage surface is exposed to the airstream in flight and must be aerodynamically smooth. An inner surface 36 has three-dimensional features thereon. For example, in this case the inner surface 36 has three-dimensional reinforcing ribs 32 integral with the wall. (That is, the ribs are not fabricated separately from the wall, and thereafter attached to the main portion of the wall. Instead, the ribs are manufactured integral with the web of the wall.) The approach of FIG. 1 is not satisfactory to fabricate this fuselage, because even if the platens 20 are curved, the platens cannot extend over large arcs and still apply a uniform pressure. Also, the large presses required in the FIG. 1 embodiment are expensive. The approach of FIG. 2 is not satisfactory to make the fuselage portion of FIG. 3, because the bladder 28 cannot be used to readily form the three-dimensional features such as the internal reinforcing ribs 32 integral with the wall 30.

Figure 5:
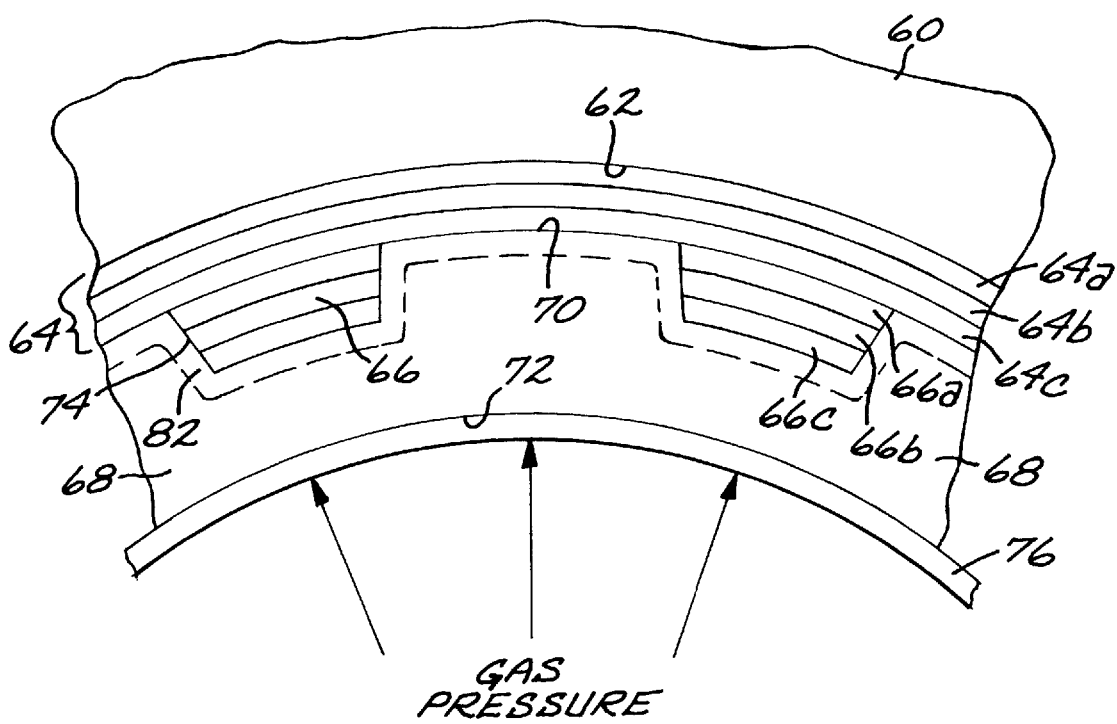
FIG. 5 is a sectional view through a fabrication assembly used to make the portion of the aircraft fuselage shown in FIG. 3.
Figure 4:
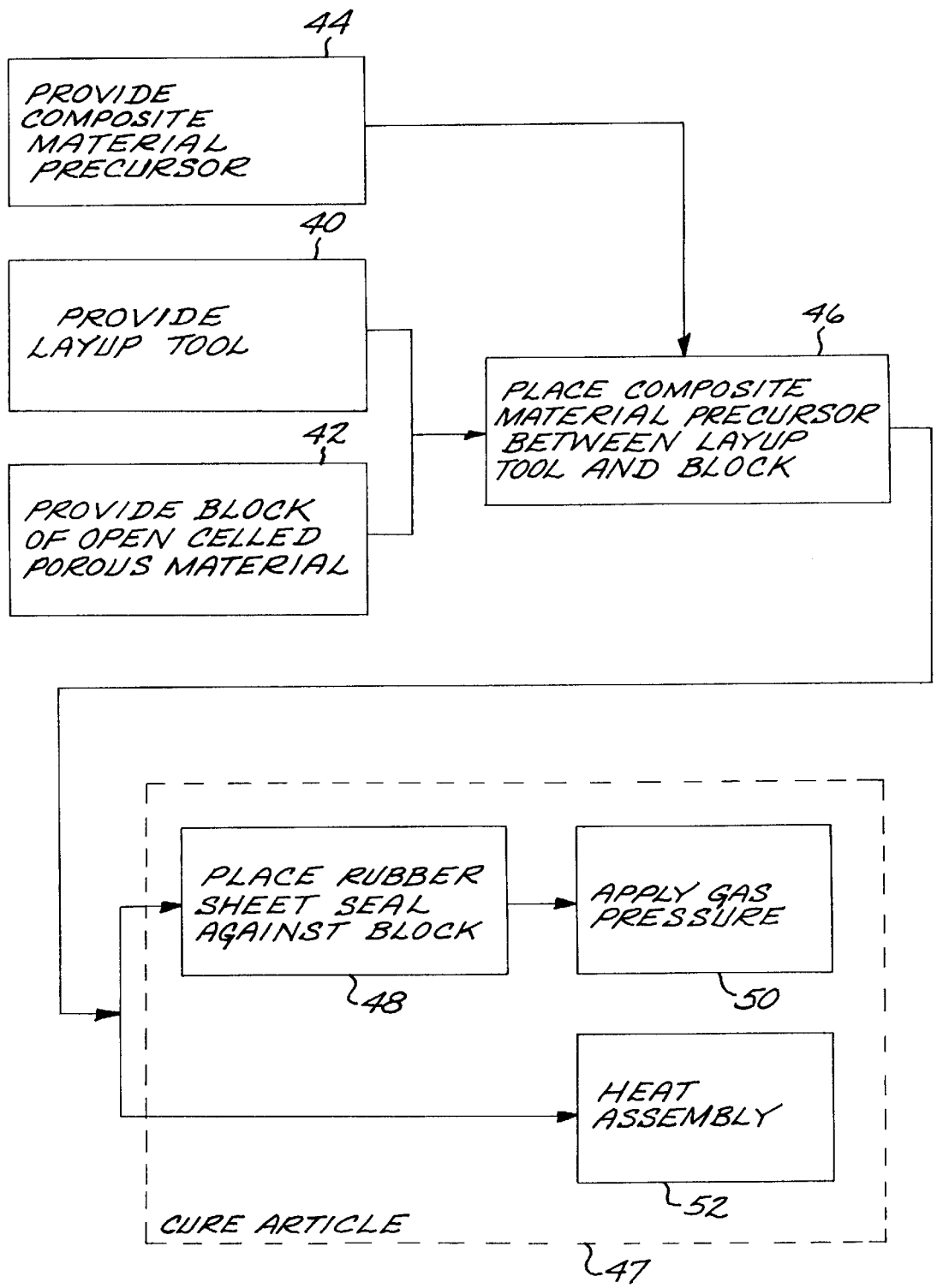
FIG. 4 is a block diagram of a method for fabricating the portion of the aircraft fuselage shown in FIG. 3.

FIG. 4 depicts in block diagram form a method according to the invention for preparing an article such as the desired portion of the fuselage, and FIG. 5 illustrates the fabrication assembly at an intermediate stage. A concavely curved female layup tool 60 is provided, numeral 40. The layup tool 60 has a concave surface 62 (when viewed exteriorly) which is generally without major features thereon. The outer surface 34 of the finished composite article is formed against this surface 62 and contains the inverse of its features. In the specific case of the aircraft fuselage of interest the surfaces 34 and 62 are generally smooth and largely featureless. The surface 62 may instead intentionally have features thereon, as will be discussed subsequently.

A block 68 of a porous material having open-celled porosity is provided, numeral 42. The porous material is preferably made of expanded polystyrene beads that have been compressed or cast to shape, a commercially available foamed product known as Styrofoam. Any other operable open-celled foam material may be used.

The porous block 68 has a first face 70 and an oppositely disposed second face 72. The first face 70 is sculpted to have a shape that defines the inner surface 36 of the final composite material wall 30. For the portion of the interior surface 36 that is smooth, the first face 70 is smooth. For the portion of the inner wall that has three-dimensional features such as the integral ribs 32, the first face 70 of the porous block 68 is sculpted with the inverse of the three-dimensional feature. That is, for a desired protruding rib 32, the first face 70 has a matching recess 74 thereon. If the three-dimensional feature on the inner surface 36 were instead a recess, the first face 70 would be sculpted as a raised region.

The porous block 68 may be "sculpted" in any operable manner. The preferred Styrofoam material may be cut with a hand tool such as a knife. To define the sculpted features more precisely, the Styrofoam block may be machined with controlled machine tools. The machining approach is most suitable for prototype or small production runs. To make large numbers of the porous blocks, which are needed because the porous block is discarded after the fabrication procedure is complete, the Styrofoam material is desirably cast to shape using conventional casting procedures for Styrofoam materials. Casting techniques for Styrofoam are well known, and generally include injecting polystyrene beads into a mold, under pressure and steam.

A composite material precursor is provided, numeral 44. The composite material precursor is preferably a material having reinforcement embedded in a matrix of a hardenable (curable) organic thermosetting resin or a thermoplastic resin. Examples of the preferred fiber reinforcement include carbon, graphite, glass, aramid (Kevlar™) fibers. Examples of matrix resin materials include epoxies, polyamides, polyesters, and vinyl esters. The present invention may be used with any such operable material that is compatible with the use of the material of the porous block.

The composite material is initially in a form termed a "precursor" because it has the components of the final composite material, with the matrix in a form that is not fully cured to a hardened state, termed an "uncured" resin herein (including both fully uncured and partially cured). The composite material precursor may be furnished in any of several forms. In the preferred form illustrated in FIG. 5, the composite material precursor is provided as prepreg composite material having fibers embedded in a partially cured matrix. Such prepreg composite material is available commercially in the form of thin strips or sheets that may be handled and positioned in the desired location. Other operable forms of the composite material precursor will be discussed subsequently.

The composite material precursor is positioned between the layup tool and the block of the open-celled porous material, numeral 46. This positioning may be accomplished either by placing the composite material precursor against the concave surface 62 of the female tool 60, placing the composite material precursor against the generally convex surface 70 of the porous block 68, or a combination of the two. In the preferred approach, multiple layers 64 (also termed "plies") of the prepreg composite precursor material are collated (laid up) against the first surface 70 of the porous block 68. In this case, for simplicity of illustration, there are three such layers 64a, 64b, and 64c, but there may be more or fewer such layers. The orientations of the fibers in the layers are selected to provide required mechanical properties in the final structure. The selection of the orientations is performed by aerostructural engineers, and is not the subject of the present application.

To make the three-dimensional features such as the integral ribs 32, extra layers 66 of the prepreg material are collated into the recesses 72 before the layers 64 are applied. In this case, three layers 66a, 66b, and 66c are illustrated, but more or fewer layers would be used as appropriate for the dimensions of the rib. In this way, the layers 66 are automatically registered within the recesses 74.

This collating sequence may be varied as appropriate for various types of articles. For example, if there were three-dimensional features in the surface 34, the composite material precursor could be collated onto that surface. In other cases, some of the composite material precursor may be collated onto the surface 34 and some of the composite material may be collated onto the surface 70, and then the tool 60 and the block 68 brought together.

The composite material precursor is thereafter cured, numeral 47. In the curing operation, the composite material precursor is simultaneously heated and compressed. The compression force is preferably provided by placing pressure seal such as a rubber sheet (bladder) 76 in contact with the second face 72 of the block 68, numeral 48, and then applying a gas pressure against the other side of the rubber sheet 76, numeral 50. The gas pressure may be either a positive pressure, or it may be an atmospheric pressure differential produced when a vacuum is pulled on the inside of the assembly. In either event, the gas pressure produces a compressive force between the female tool 60 and the block 68, through the collated layers 64 and 66 of composite precursor material.

Figure 8:
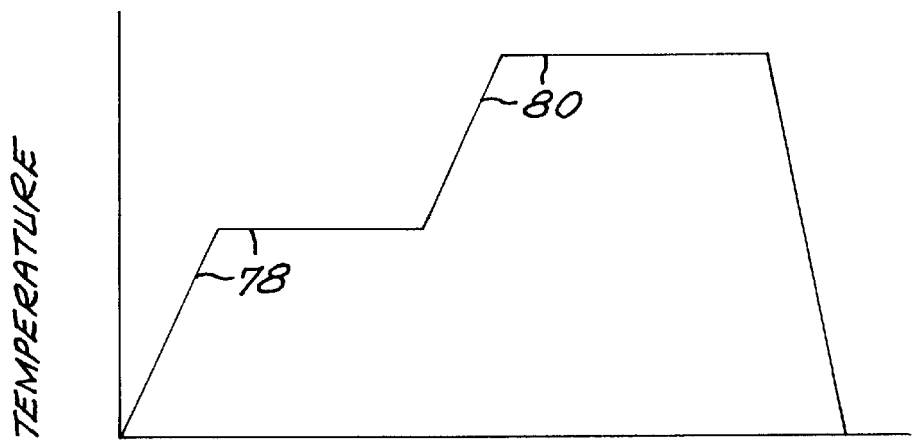
FIG. 8 is a schematic graph of temperature as a function of time during curing.

Simultaneously with at least a portion of the compressing step 50, the fabrication assembly is heated in an oven, numeral 52. In the case of the preferred Styrofoam block material, the heating is preferably accomplished in two steps, as illustrated schematically in FIG. 8. In the first step 78, the fabrication assembly is heated to an intermediate temperature of from about 120°–130° F. for initial compaction of the composite precursor material and setting of the resin of the composite material. The first step 78 thus defines the shape of the inner surface 36 of the article. The intermediate temperature of the first step 78 is selected to be less than 140° F., a temperature at and above which the Styrofoam essentially loses its load-carrying ability. The shape of the inner surface 36 must be defined before the Styrofoam passes into that state. After the first step 78, the resin matrix of the composite precursor material is compacted so as to remove the gas therein, and partially cured. In the second step 80, the temperature is thereafter raised to a curing temperature at which the resin matrix material cures. The curing temperature is selected according to the manufacturer's recommendations for the organic resin matrix material, and will vary according to the material chosen for the matrix. The fabrication assembly is thereafter cured and the cured article removed from the tooling and rubber bagging material. If desired for a particular selected resin material, the free-standing article may be post-cured.

During the curing operation, gas is evolved from the composite material as it is compacted under pressure in step 47. The gas is removed by diffusion into the pores of the open-celled block material, which is preferably the Styrofoam. Additionally, excess resin extrudes from the composite material into the pores of the porous material, producing a resin-filled zone 82 just below the first face 70 of the block 68. At the completion of the processing cycle, the block 68 with the resin-filled zone 82 is discarded. The use of the open-celled porous material to remove evolved gas and extruded resin is an important advantage of the present invention, because the volumes of evolved gas and extruded resin are high in many complexly shaped articles. Also, quite large articles may be made without any breather cloth or passages 26 in the tooling.

Figure 6:
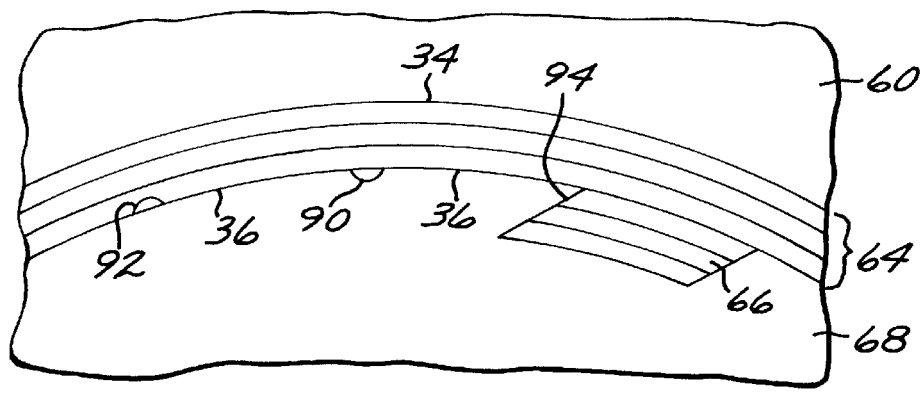
FIG. 6 is a schematic detail of the fabrication assembly as used to make other types of three-dimensional features.

The use of the porous block 68 as the primary pressure-application medium to the composite precursor material allows the preparation of three-dimensional features on the outer surface 34 and inner surface 36 that are not otherwise easily produced. Some other types of these three-dimensional features are illustrated in FIG. 6, for a fabrication assembly similar to that of FIG. 5. Small recesses 90 or bumps 92 on the surface 36 (or the surface 34) are formed by sculpting the appropriate inverse features into the block 68. In another case, a rib or other feature with a negative draft (i.e., undercut), as illustrated at numeral 94 of FIG. 6, may be prepared using the present approach wherein the compacting pressure is applied to the composite precursor material through the solid but porous block rather than a flexible bladder. (The rubber sheet 76 applies pressure to the block 68, but it is the block that contacts and applies pressure to the composite precursor material.) Such a feature with a negative draft may be present at, for example, apertures such as windows through the wall 30. The block 68 serves as a pressure intensifier to maintain compaction pressure into these regions during the compaction phase of the processing. This is to be contrasted with the common practice of applying the primary pressing and forming pressure to the composite precursor material with a vacuum bag bladder. The bladder cannot deform into regions such as the region of negative draft in such a manner that sufficient compaction pressure may be applied during the curing operation.

Semicylindrical, full-size prototype fuselage sections have been made using the approach of the invention.

Figure 7:
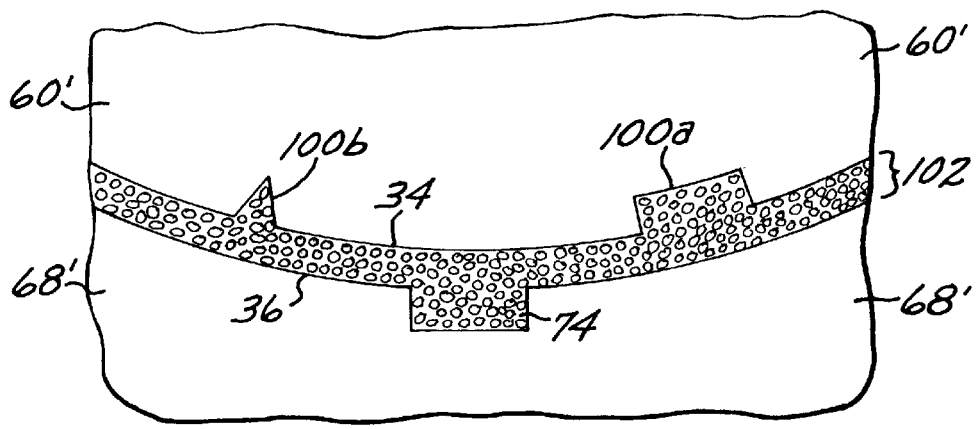
FIG. 7 is a schematic detail of a fabrication assembly used with a convexly curved female layup tool.

The preferred applications of the invention have been discussed previously, but the use of the invention is not so limited. FIG. 7 illustrates an alternative configuration wherein the tool 60' is convex rather than concave. The tool 60' has two types of three-dimensional features 100 in the surface 34, in each case a recess that is translated to an external rib in the final composite article. The rib may be, for example, a generally rectangular cross-section rib 100a or a triangular cross-section rib 100b. Another modification, also illustrated in FIG. 7, to the approach discussed previously is that the composite material is deposited not by layup and collation, but by a filament winding procedure to produce a wound composite precursor material 102. The winding procedure may be of any operable type, such as, for example, a wet winding technique. Various combinations of the features discussed herein may be used together, as long as they are not incompatible.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for manufacturing a composite article, comprising the steps of:

providing a layup tool;

providing a breather material comprising a block of an open-celled porous material, the block having a first face sculpted to define a first face of the composite article and an oppositely disposed second face;

providing a composite material precursor;

positioning the composite material precursor between the layup tool and the block of the open-celled porous material, to form a fabrication assembly;

applying a pressure between the layup tool and the block of the open-celled porous material, and thence to the composite material precursor therebetween;

heating the fabrication assembly simultaneously with the step of applying a pressure, the steps of applying and heating the composite material precursor to compact and cure; and thereafter separating the breather material from the compose article.

2. The method of claim 1, wherein the step of providing a layup tool includes the step of providing a concavely curved female tool.

3. The method of claim 1, wherein the step of providing a layup tool includes the step of providing a layup tool having a layup tool three-dimensional feature thereon.

4. The method of claim 1, wherein the step of providing a composite material precursor includes the step of providing plies of prepreg composite material.

5. The method of claim 1, wherein the step of providing a composite material precursor includes the step of providing a composite material formed of fibers embedded in an uncured resin matrix, the fibers being selected from the group consisting of carbon, graphite, glass, and aramid, and the uncured resin being selected from the group consisting of epoxies, polyamides, polyesters, and vinyl esters.

6. The method of claim 1, wherein the step of providing a breather material includes the step of providing a block made of foam.

7. The method of claim 1, wherein the step of providing a breather material includes the step of providing a block having a block first face three-dimensional feature thereon.

8. The method of claim 1, wherein the step of providing a breather material includes the step of providing a block having an inverse of a negative draft feature.

9. The method of claim 1, wherein the step of providing a breather material includes the step of machining the first face of the block.

10. The method of claim 1, wherein the step of providing a breather material includes the step of casting the block to shape in a casting mold.

11. The method of claim 1, wherein the step of applying a pressure includes the step of placing a pressure seal against the second face of the block of the open-celled porous material, forming a fabrication assembly, and applying a gas pressure to the pressure seal.

12. The method of claim 11, wherein the step of placing a pressure seal includes the step of providing a rubber sheet, and placing the rubber sheet into position as the pressure seal.

13. A method for manufacturing a composite article, comprising the steps of:

providing a concavely curved female layup tool having a concave layup surface;

providing a breather material comprising a block of an open-celled foam material, the block having a first face sculpted to define a first face of the composite article and having a plurality of first-face features thereon, and an oppositely disposed second face;

providing a composite material precursor comprising at lest one layer of an uncured prepreg composite material;

positioning the composite material precursor between the layup tool and the block of the open-celled porous material;

placing a pressure seal a the second face of the block of the open-celled foam material, forming a fabrication assembly;

applying a pressure between the layup tool and the pressure seal, and thence to the block of the open-celled foam material and to the uncured composite material precusor, and, simultaneously, heating the fabrication assembly, the steps of applying and being casing the uncured composite material precursor to compact and cure; and thereafter separating the breather material from the composite article.

14. The method of claim 13, wherein the step of depositing includes the step of providing a composite material formed of fibers embedded in an uncured resin matrix, the fibers being selected from the group consisting of carbon, graphite, glass, and aramid, and the uncured resin being selected from the group consisting of epoxies, polyamides, polyesters, and vinyl esters.

15. The method of claim 13, wherein the step of providing a breather material includes the step of providing a block made of foam.

16. The method of claim 13, wherein the step of providing a breather material includes the step of providing a block having a block first face three-dimensional feature thereon.

17. The method of claim 13, wherein the step of providing a breather material includes the step of machining the first face of the block.

18. The method of claim 13, wherein the step of providing a breather material includes the step of casting the block to shape in a casting mold.

19. The method of claim 13, wherein the step of placing a pressure seal includes the step of providing a rubber sheet, and placing the rubber sheet into position as the pressure seal.

20. A method for manufacturing a composite article, comprising the steps of:

providing a concavely curved female layup tool having a generally unfeatured concave surface thereof, the layup tool defining an outer surface of a portion of a fuselage of an aircraft;

providing a breather material comprising a block of an open-celled foam material, the block having a convexly curved first face sculpted to define an inner face of the portion of the fuselage of the aircraft and a plurality of recesses to define a plurality of reinforcing ribs integral with the fuselage of the aircraft, and an oppositely disposed second face;

providing an uncured prepeg composite material precursor;

positioning the composite material precursor between the layup tool and the block of the open-celled porous material;

placing a rubber sheet pressure seal against the second face of the block of the open-celled foam material, forming a fabrication assembly;

applying a gas pressure to the rubber sheet pressure seal, thereby applying a compressive pressure between the layup tool and the pressure seal, and thence to the positioning the composite material precursor or between the layup tool and the block of the open-celled porous material;

placing a rubber sheet pressure seal against the second face of the block of the open-celled foam material forming a fabrication assembly;

applying a gas pressure to the rubber sheet pressure seal, thereby applying a compressive pressure between the layup tool and the pressure seal, and thence to the block of the open-celled foam material and to the uncured prepeg composite material, and, simultaneously, heating the fabrication assembly, the steps of applying and heating causing the uncured prepreg composite material to compact and cure; and separating the breather material from the composite article.

\* \* \* \* \*